Patented June 13, 1939

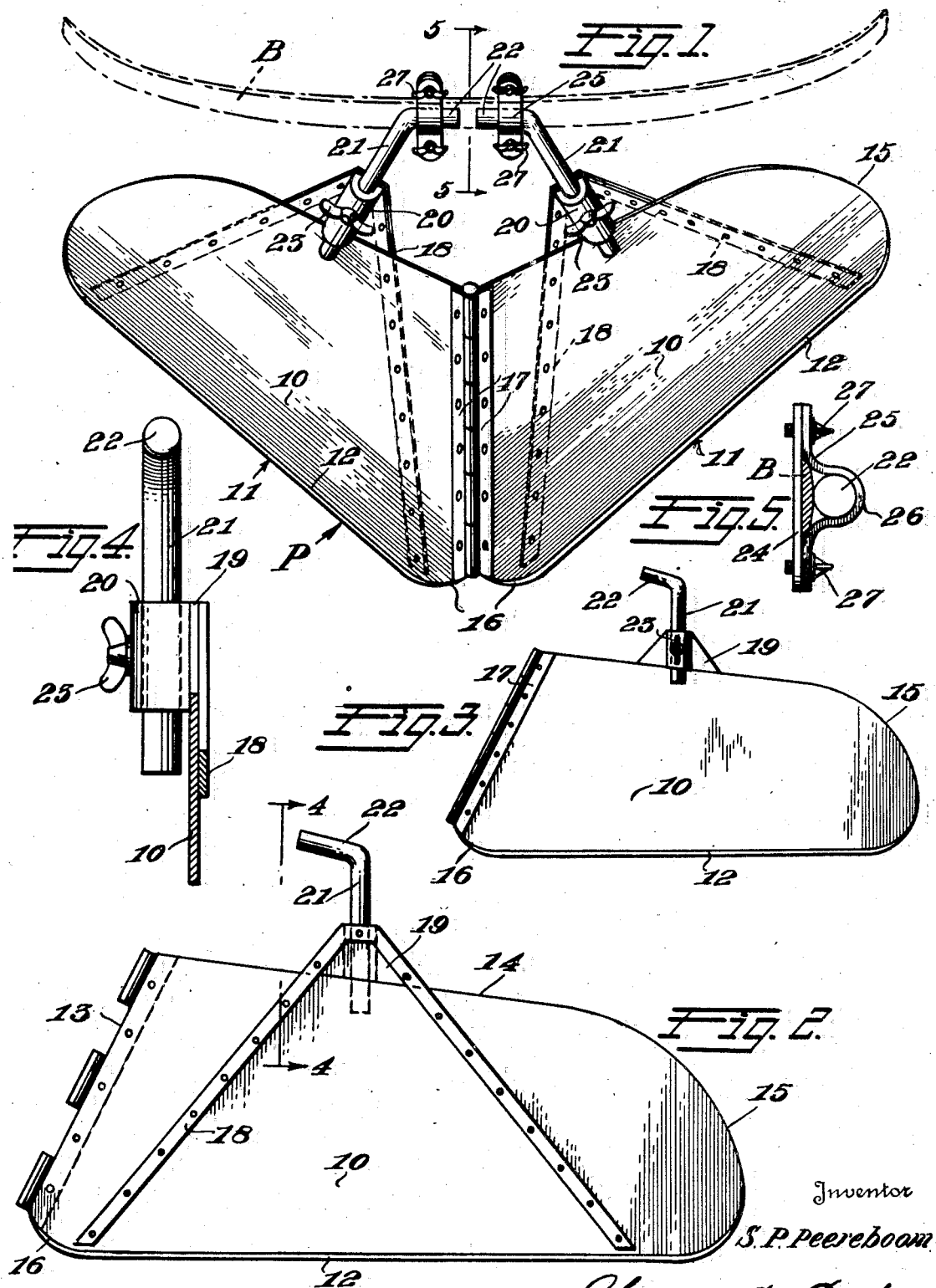

2,162,635

UNITED STATES PATENT OFFICE 2,162,635

SNOW PLOW

Simon P. Peereboom, Rockville Centre, N. Y.

Application August 31, 1938, Serial No. 227,835

4 Claims. (Cl. 37—44)

This invention relates to snow plows.

More particularly, the invention relates to snow plows for detachable connection with automobiles for clearing snow from a driveway either in front or back of the automobile.

Automobile drivers, during winter months, often find their cars snow-bound when parked or even in garages, which has necessitated much time and effort in extricating the snow before their cars could be driven away.

Not only have such circumstances as above-mentioned been experienced, but it is not uncommon during relatively long stretches of travel to encounter snow storms which cover the roadway to such depth as to make driving hazardous as well as causing considerable delay and annoyance.

While plows have heretofore been proposed or used for clearing a roadway of snow in advance of a moving automobile, they have not been of such compact construction that they could be readily carried as an accessory in the automobile, and furthermore, such prior constructions could not be easily and quickly attached to and detached from an automobile, as a result of which they have not satisfied the maximum requirements of structures of this general character.

A primary object of this invention is the provision of a snow plow for use with automobiles, which substantially overcomes the above-noted objections to prior constructions of this general character.

A further object of the invention is the provision of a snow plow which is simple in construction, light in weight, durable, efficient in operation, and which is capable of manufacture at relatively low cost.

A still further object of the invention is the provision of a snow plow for use with automobiles, which is capable of being collapsed for transportation as an accessory in the automobile and which is of such simple construction that it can expeditiously be secured to or removed from either the front or rear bumper of an automobile.

For a more complete understanding of the nature and objects of the invention, reference will be had to the following detailed description, taken in connection with the accompanying drawing, in which:

Fig. 1 is a front perspective view of the snow plow in accordance with a preferred embodiment of the invention, the plow being shown attached to an automobile bumper indicated in dot-and-dash lines;

Fig. 1 is an inside elevational view of one of the plow wings, showing in particular the attachment of the brace member thereto;

Fig. 3 is an elevational view, on a reduced scale, of the folded or collapsed plow for facilitating transportation thereof;

Fig. 4 is a vertical transverse sectional view in a plane substantially as represented by line 4—4 in Fig. 2; and Fig. 5 is a similar view in a plane substantially as represented by line 5—5 in Fig. 1.

Referring in detail to the drawing by reference characters, and wherein like characters designate like parts, P designates the plow in its entirety and B designates an automobile bumper, which may either be the front or rear one.

The plow P comprises a pair of wings or blades 10, which are of symmetrical form. The wings 10 may be formed of relatively light gauge sheet steel and each has a lower edge 11, which edges are in a common horizontal plane when the wings are opened into plow form, as indicated in Fig. 1, and each edge 11 is preferably reinforced by a bead or rib 12, which may be formed by rolling the edge 11 or by any other suitable means. The beads 12 not only provide reinforcements for the wings 10, but they act as runners for easy sliding of the plow in the snow.

Each wing or blade 10 further includes a front edge 13 at an angle to edge 11 and a top edge 14 also at an angle to edge 11.

In other words, the edges 13 and 14 are such that when the wings 10 are opened out, the apex defined by the angularly disposed wings slopes forwardly from top to bottom and the top edges of the wings slope downwardly toward the rear ends of the wings.

The rear end of each wing 10 is preferably rounded, as indicated at 15, and each wing is preferably slightly rounded at the junction of edges 11 and 13, as is indicated at 16.

The wings or blades 10 are hinged together at their adjacent end edges 13, as by means of cooperating hinge plates 17 riveted to the wings. If desired, the hinge may be provided by rolling portions of the edges 13.

The alternating tube portions on plates 17 are, of course, engaged by a long rod or pintle, as is common in hinge construction.

Riveted or otherwise secured to the inner face of each wing 10 is a substantially V-shaped brace member 18, to the apex of which is secured a triangular plate 19 having a guide bushing 20 overhanging the wing toward the outer face thereof.

Slidably mounted in each bushing 20 is an elongated shank 21 of an attaching handle, which includes, in addition to the shank 21, an angularly extending portion 22. The shanks 21 are freely slidably in bushings 20 and are rigidly secured in any adjusted position therein by thumb-screws 23.

A pair of cooperating clamp plates 24 and 25 are provided for securing each handle extension 22 to the bumper B.

The clamp plate 25 provides a curved recess 26 for engaging extension 22 and binding it against the bumper B. The clamp plates 24 and 25 are held in clamping position by thumbscrews 27.

From the foregoing, it will be readily appreciated that the plow in accordance with this invention is simple in construction, and due to the hinge connection 17, the wings or blades 10 can be folded into flat engaging position, as indicated in Fig. 3, whereby the plow can readily be carried in the trunk or other available relatively small space for ready use as occasion may demand.

Upon encountering snow on the roadway, the collapsed plow may be attached to the bumper B quickly and easily by simply opening the wings 10 about the hinge 17 and attaching the extensions 22 to the bumper by the clamp plates 24 and 25.

The shanks 21 are not only slidable lengthwise in bushings 20, but they are capable of rotation therein upon loosening the screws 23, as a result of which the extensions 22 can be properly aligned with the outer face of the bumper B.

The vertical adjustment of the shanks 21 in bushings 20 provides for attachment of the plow to bumpers of different heights from the ground. Any particular automobile driver will, of course, have to adjust the attaching handles once for any one car, and all that is then required in installing or removing the plow is the simple manipulation of the clamp plates 24 and 25.

The formation of the wings or blades 10, as disclosed, provides a relatively high front end on the plow for efficiently meeting the first impact with the snow, which, thereafter, spreads down the sides of the wings 10 toward the rear ends thereof.

By making the rear ends of the wings of less height than the front ends, the weight is also substantially reduced, which is an important consideration in constructions of this character.

The rounded ends of the blades together with the beads 12 provide for easy movement of the plow even in the face of obstructions.

The plow P may be secured to either the rear or front bumper B. Thus, for example, when a car is snow-bound in a garage, the plow may quickly be attached to the rear bumper, and upon backing the car out of the garage, the impeding snow will be cleared away. The plow may then be transferred to the front bumper and an entire driveway quickly cleared of snow upon forward movement of the car.

The plow may, of course, be put to use upon traveling the highways if a traffic-impeding snowstorm should be encountered.

While I have disclosed but a single specific embodiment of my invention, same is to be considered as illustrative only, and not restrictive, the scope of the invention being defined in the subjoined claims.

What I claim as new and desire to secure by U. S. Letters Patent is:

1. A snow plow for automobiles comprising a pair of wings hingedly connected together at adjacent ends, the hingedly connected ends sloping downwardly and forwardly and defining the prow of the plow, the wings sloping downwardly and rearwardly from the hinged ends and being rounded at their rear ends, and means supported by each wing for adjustably securing the plow to a bumper of an automobile.

2. A snow plow as defined in claim 1, wherein each wing is provided with a reinforcing bead at its road-engaging edge, the beads providing runners for the plow.

3. A snow plow as defined in claim 1, wherein said means comprises a V-shaped brace secured to the wing, a bushing secured to the apex of the brace, and a securing handle axially and rotatably adjustable in the bushing.

4. A snow plow for automobiles comprising a pair of wings in angular relation to each other in operative position thereof, an elongated handle member adjustably supported by each of the wings, and a pair of cooperating clamp plates for detachably securing each handle member to a bumper of an automobile, said wings being pivotally connected at their adjacent front ends for folding thereof into flat superimposed position for storage or transportation of the plow.

SIMON P. PEEREBOOM.